June 2, 1970     R. C. SYMONS     3,515,297
LOGGING VEHICLE
Original Filed Sept. 24, 1965     2 Sheets-Sheet 1
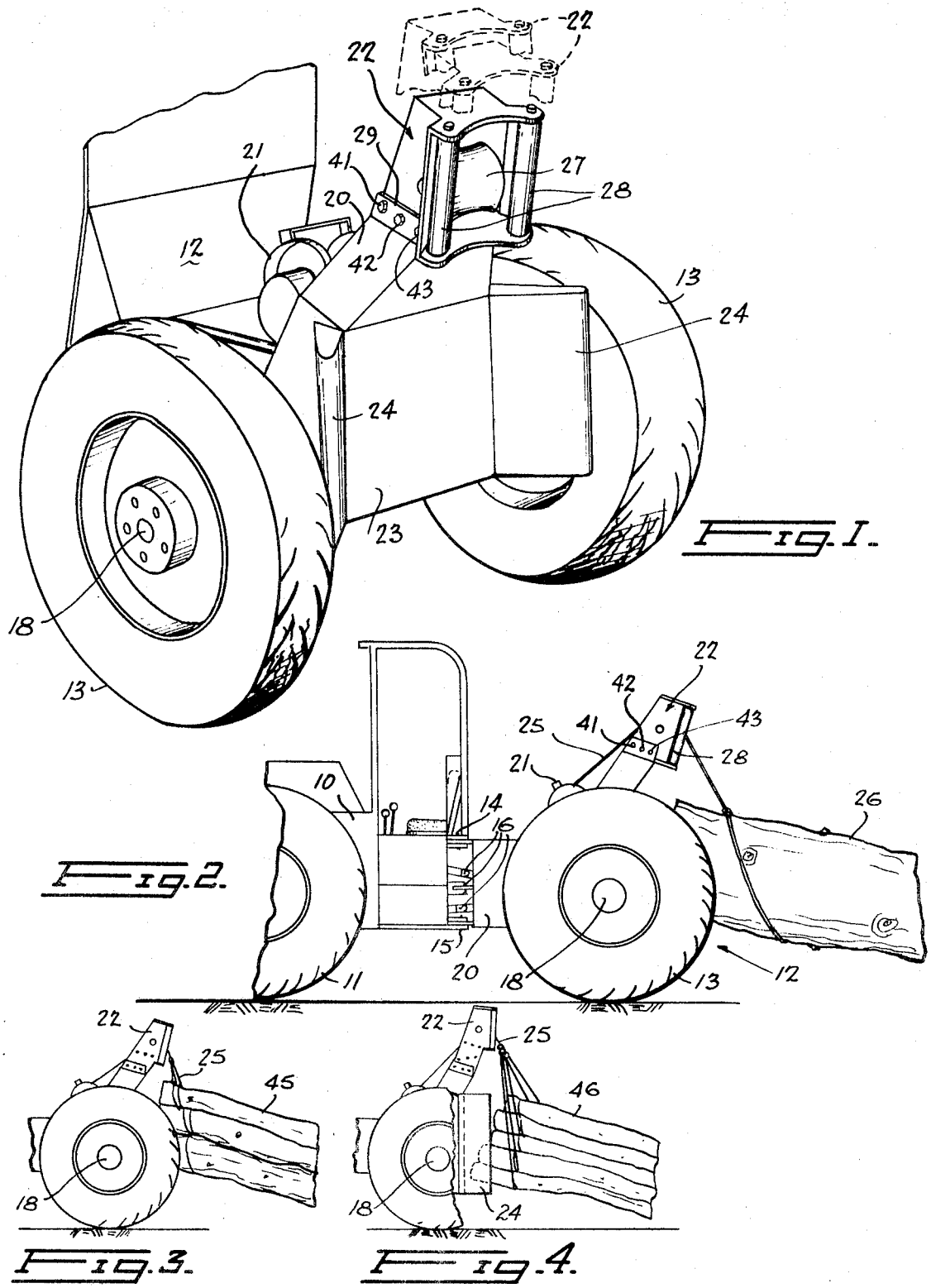

June 2, 1970  R. C. SYMONS  3,515,297
LOGGING VEHICLE

Original Filed Sept. 24, 1965  2 Sheets-Sheet 2

3,515,297
LOGGING VEHICLE
Robert C. Symons, Woodstock, Ontario, Canada, assignor to Timberjack Machines Limited, Woodstock, Ontario, Canada
Continuation of application Ser. No. 489,966, Sept. 24, 1965. This application May 2, 1968, Ser. No. 742,991
Int. Cl. B60p 3/00
U.S. Cl. 214—85.5                                                         9 Claims

ABSTRACT OF THE DISCLOSURE

An elevated fairlead is mounted at the rear of the vehicle, a winch pulling in a cable passing over a roller of the fairlead for hauling a timber load up against a butt pan. The vertical location of the fairlead is adjustable between a number of different positions to suit various load conditions. The butt pan may have a central projection to help stabilize a load.

---

This application is a continuation of application Ser. No. 489,966 filed Sept. 24, 1965, now abandoned.

This invention relates to improvements in vehicles of the type commonly employed in the logging industry, which incorporate a winch for hauling logs in to the vehicle by a cable, and which provide also for subsequent towing of the logs during travel of the vehicle itself Such vehicles are commonly referred to as skidders.

It is desirable that such vehicles should be versatile in their ability to handle either heavy timber, medium size timber or light timber, as well as bundles of cut logs. One of the problems encountered in the past has been that vehicles designed to deal effectively with one type of timber are often not ideally suited to the handling of another type. Other vehicles have encountered steering problems when loaded.

The principal object of the present invention is the provision of a vehicle that is sufficiently versatile and adaptable to provide good operating performance including a good steering response under various different conditions.

Parts of a vehicle incorporating the various inventive features of the present invention are illustrated diagrammatically in the accompanying drawings. It is to be understood that these illustrations, and the description thereof which follows, are provided by way of example only, the broad scope of the invention being defined by the appended claims.

In the drawings:

FIG. 1 is a perspective rear view of the rear portion of a first form of vehicle;

FIG. 2 is a side view of FIG. 1, illustrating one mode of operation;

FIG. 3 is a similar view to FIG. 2 illustrating a second mode of operation;

FIG. 4 is a partly sectioned view similar to FIGS. 2 and 3 illustrating a third mode of operation;

Figure 5:
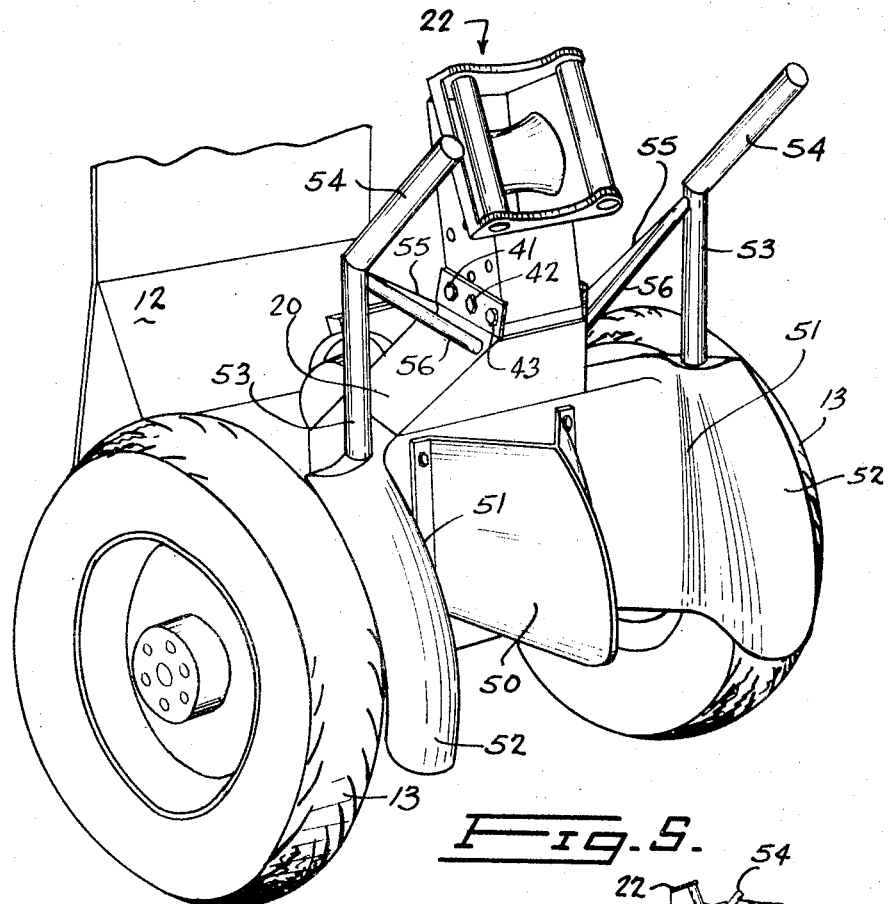
FIG. 5 is a rear perspective view of an alternative vehicle construction.

Referring firstly to FIGS. 1 to 4, the vehicle will be seen to be of the articulated type having a front portion 10 with road wheels 11 and a rear portion 12 with road wheels 13, the two portions 10 and 12 being articulated for relative pivoting about a vertical axis defined by pins 14 and 15. The various drive shafts and control rods are shown generally at 16. A typical such vehicle is illustrated in Canadian Pat. No. 689,331 issued June 23, 1964.

The rear portion 12 of the vehicle comprises a frame 20 on which is mounted the rear axle 18 supporting the wheels 13; a winch 21; a fairlead assembly 22; and a butt pan having a surface 23 extending transversely across the vehicle to act as a stop for a timber load, and outwardly sloping sides 24.

Figure 7:
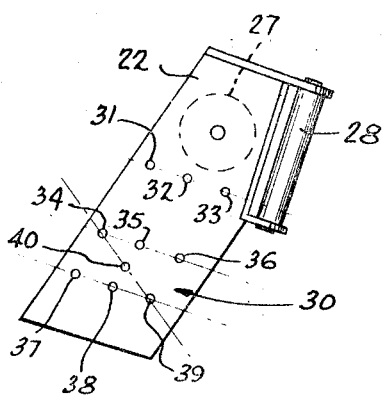
FIG. 7 is a fragmentary view showing the fairlead portion of the structure shown in FIGS. 1 to 6.

The fairlead 22 comprises a hood-like structure through which a cable 25 can be reeved for connection to a heavy timber 26 as illustrated in FIG. 2, such cable 25 passing over a horizontal roller 27 and then between two vertical rollers 28 in the fairlead. Downwardly depending side plates 30 (FIG. 7) of the fairlead 22 are formed with four sets of bolt holes 31, 32, 33; 34, 35, 36; 37, 38, 39 and, using two of the holes again, 34, 40, 39, the holes of each set being similarly spaced apart from each other for cooperation with bolts 41, 42 and 43 extending through corresponding bolt holes in upstanding side members 29 on each side of the frame 20. The side plates 30 of the fairlead 22 together with the members 29 of the frame 20 thus constitute telescoping boom means for securing the fairlead 22 to the frame 20 at a selected one of a plurality of possible positions.

When the bolts engage holes 31, 32 and 33, the fairlead 22 is in the position shown in FIGS. 1 and 2 (in solid lines); when they engage the bolt holes 34, 35 and 36, the fairlead is in the position shown in FIG. 3 and the lower broken line position of FIG. 1; and when they cooperate with the holes 37, 38 and 39, the fairlead 22 is in the position shown in FIG. 4. There is also a fourth position for the fairlead 22 (illustrated in FIGS. 5 and 6 and by the upper broken line position of FIG. 1) when the bolts engage the holes 34, 40 and 39.

It will be noted that the three modes of operation illustrated in FIGS. 2 to 4 represent three different heights for the fairlead 22; the lowermost position usually being employed with heavy timber 26; the middle position usually being employed with medium weight timber 45; and the uppermost position usually being employed when winching in light timber 46. Positioning of fairlead 22 at its highest position (FIG. 4) substantially assists bringing in the trees over stumps and other debris on the ground. The higher the fairlead 22, the easier it is to pull the timber in, in this respect. Also, the total load can be lifted higher off the ground, when the fairlead is in its upper position, which usually means that a greater proportion of the weight is transmitted to the ground through the rear-axle bearings of the vehicle and less weight drags on the ground. The result is easier towing and a general reduction in wear and tear on the machine and other rigging. There is also a general tendency to keep the wood cleaner, which in turn reduces the wear and tear on the power saws employed to cut the wood into lengths for pulping.

It would thus seem desirable always to have the fairlead as high as possible. However, the force necessary to winch in a very heavy load, such as the heavy timber 26 shown in FIG. 2, may tend to cause the front portion 10 of the vehicle to rise completely off the ground, if the fairlead is too high. This winching in problem is usually not so severe in the situation depicted in FIG. 4, because here the smaller trees can be picked up a few at a time to reduce the total pulling requirement on the cable 25. For these reasons, when handling heavy timbers the fairlead 22 is usually placed in its lowermost position shown in FIG. 2, where the lever arm of the cable acting about the axle 18 of the rear road wheels 13 is less and the danger of raising the front end of the vehicle is reduced. The vehicle is versatile, however, in that it is possible, by a simple rearrangement of the fairlead 22, to change from the low fairlead position usually desirable for heavy timbers (FIG. 2), through an intermediate fairlead position more appropriate for medium sized timbers (FIG. 3), to the high position (FIG. 4) which is often most satisfactory for lighter timbers.

Note that the movement of the fairlead between these three positions takes place mainly in the vertical direction, although there is some rearward movement of the fairlead as it is elevated. Unlike some prior proposals in which the fairlead has been arranged to pivot in an arc about a forwardly located axis so that elevation of the fairlead has simultaneously introduced a significant component of forward horizontal displacement, the three positions of the roller 27 in FIGS. 2 to 4 are arranged in a straight and approximately vertical line, what horizontal movement there is being rearward rather than forward with elevation. This has the effect of keeping the roller 27 at substantially the same horizontal position in relation to the rear wheels 13 and the butt pan surface 23. In other words, while the axis of the roller 27 is located slightly rearwardly of the centre line of the axle 18 and at least as far to the rear of the vehicle as the transverse surface 23 of the butt pan (see FIG. 4), this amount of rearward projection does not vary very much. If the axis of the fairlead roller 27 were arranged too far rearwardly, the load would exert so much leverage on the vehicle that it would become difficult and sometimes impossible to turn a corner. On the other hand, if the axis of the fairlead roller 27 were arranged much ahead of where it is shown, and more specifically ahead of the butt pan surface 23, the load would tend to interfere with proper traction by the rear tires when the vehicle is turning. Steering may be impeded, because, if the butt pan surface 23 is behind the roller axis, there is a tendency for the load to be pulled up tightly against the butt pan surface and to act as a rigid dragging tail on the vehicle.

By having a substantially vertical movement between the three fairlead positions, it is possible to choose the ideal distance for the axis of the fairlead roller 27 to project rearwardly beyond the back axle and the butt pan surface for each of the three positions. As already mentioned, in the example shown, there is a slight increase of rearward projection in the higher FIGS. 3 and 4 positions, relative to the FIG. 2 position. This is convenient, since the loads tend to be lighter when the higher positions are in use and the amount that the fairlead is moved rearwardly is not large.

Figure 6:
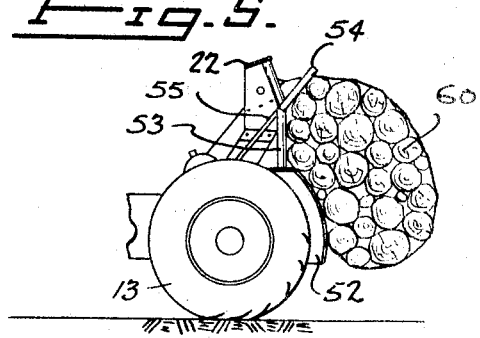
FIG 6 is a side view of the construction of FIG. 5, illustrating yet another mode of operation.

FIGS. 5 and 6 show a fourth position of the fairlead 22, which position is particularly suited to use with the modified butt pan construction shown in FIG. 5. This butt pan includes a narrow rearwardly projecting centre member 50; extended side portions 51 including wheel guard members 52; and timber abutments in the form of tubular vertical stanchions 53 with rearwardly inclined upper extensions 54. Bracing members 55 and 56 support the structure rigidly and securely fasten it to the frame 20.

As FIGS. 5 and 6 illustrate, this particular form of butt pan construction is associated with location of the fairlead 22 in its fourth position in which it is tilted more forwardly than in the other three positions. This form of the invention is used when the vehicle is employed to lift a bundle of cut logs 60, with the latter being hauled tightly up off the ground and against the abutment surfaces provided by the parts 50, 52, 53 and 54 in the manner shown in FIG. 6.

In prior designs of vehicle for this latter type of operation, the bundle of cut wood has been hauled up to the rear of the vehicle with no provision for supporting the top of the bundle, that is to say, no parts equivalent to the parts 53 and 54 of the present construction. The result has been that, when travelling over rough ground, the load has had a substantial tendency to sway in a pendulum motion. This results in continual overloading of one tire or the other, and in extreme cases can even jeopardise the stability of the vehicle and cause it to overturn. By pulling the wood tightly up against a series of abutment surfaces, it is held stationary. Another consideration is that, as the wood is being winched up, it may tend to arrive oriented otherwise than parallel to the abutment surfaces. However, on striking such surfaces it will be turned and brought into the correct tight parallel orientation shown in FIG. 6. This again ensures a more balanced load and is more convenient when the load is dropped and piled at the destination. When using prior vehicles designed for this purpose the tendency has often been observed for the wood to lose its parallelism and extend crossways in the sling, with the result that it will not pile properly when dropped at the destination.

It will thus be seen that the illustrated forms of the invention have provided logging vehicles in which the height of the fairlead can be simply and readily changed to provide an optimum value for each of various operating conditions. As will be understood, the higher the fairlead and consequently the higher the log load, the greater the proportion of the weight of the load being pulled that is placed on the vehicle which travels on large diameter wheels mounted on bearings. This reduces the friction of the load, since the part not supported by the vehicle is dragged over ground which is usually very rough. Generally speaking, the higher the load, the less horse power required to move it. Another advantage of lifting the load well up and keeping as much of it off the ground as possible is that the wood must subsequently be cut into shorter lengths and the less mud and gravel that is imbedded in the trees the less will be the cost of maintenance of the saws that eventually cut the wood into short lengths.

There is, however, as mentioned above, a limit to how high the fairlead can be for a given load. The higher the fairlead, the greater the leverage on the front end of the vehicle tending to lift the front wheels off the ground. For this reason, when skidding large trees the fairlead should be kept low, while the lighter loads can be pulled from a higher position without risk of lifting the front of the vehicle off the ground.

I claim:
1. At the rear of a logging vehicle:
   (a) a frame connected to a rear axle driving a pair of road wheels,
   (b) an elevated fairlead mounted on said frame and including a roller rotatable about a horizontal axis,
   (c) a butt pan surface provided on said frame and extending transversely across the rear of the vehicle to act as a stop for a timber load,
   (d) a winch for pulling in a cable passing over said roller to the timber load for hauling the load to the vehicle and for subsequently towing the load during travel of the vehicle,
   (e) and telescoping beam means securing said fairlead to the frame selectively in one of a plurality of positions, the location of the fairlead in a first of said positions being generally vertically above the location of the fairlead in a second of said positions, the horizontal location of the roller axis of the fairlead remaining at least as far to the rear of the vehicle as said butt pan surface in both said positions.

2. At the rear of a logging vehicle:
(a) a frame connected to a rear axle driving a pair of road wheels,
(b) an elevated fairlead mounted on said frame and including a roller rotatable about a horizontal axis,
(c) a butt pan surface provided on said frame and extending transversely across the rear of the vehicle to act as a stop for a timber load,
(d) a winch for pulling in a cable passing over said roller to the timber load for hauling the load to the vehicle and for subsequently towing the load during travel of the vehicle,
(e) and means securing said fairlead to the frame selectively on one of a plurality of positions, the location of the fairlead in a first of said positions being generally vertically above the location of the fairlead in a second of said positions, the horizontal location of the roller axis of the fairlead remaining at least as far to the rear of the vehicle as said butt pan surface in both said positions,
(f) wherein said securing means includes means for securing said fairlead to the frame in a further position in which said fairlead is vertically elevated to substantially the same extent as in said first position, but which further position is located horizontally more forwardly on the vehicle frame than said first position,
(g) and wherein said frame includes:
  (i) abutment members projecting upwardly from the butt pan to at least the height of the fairlead in said further position,
  (ii) wheel guard members projecting laterally and rearwardly from the butt pan to locations rearward of said wheels,
  (iii) and a rearwardly projecting narrow member centrally located in said butt pan,
  (iv) all said members (i), (ii) and (iii) cooperating for firmly engaging and stabilizing a load of cut timber extending transversely of the vehicle and hauled by the cable against said member when said fairlead is situated in said further position.

3. At the rear of a logging vehicle:
(a) a frame connected to a rear axle driving a pair of road wheels,
(b) an elevated fairlead mounted on said frame and including a roller rotatable about a horizontal axis,
(c) a winch for pulling in a cable passing over said roller to the timber load for hauling the load to the vehicle and for subsequently towing the load during travel of the vehicle,
(d) and telescoping beam means securing said fairlead to the frame selectively in one of three positions, the location of the fairlead in a first of said positions being vertically above and somewhat rearward of the location of the fairlead in a second of of said positions, the location of the fairlead in said second position being vertically above and somewhat rearward of the location of the fairlead in a third of said positions.

4. In combination with a logging vehicle:
(a) a frame connected to a rear axle driving a pair of road wheels,
(b) an elevated fairlead mounted on said frame, said fairlead including a pair of like spaced-apart, parallel side plates between them freely pivotally supporting a roller about a horizontal axis at a fixed upper location thereon, said side plates having lower portions bearing upon correspondingly spaced-apart side members of said frame, said side plates being adjustable relative to said side members between a plurality of positions,
(c) means engaging said side plates and side members for securing the same together and thus for positioning said fairlead on the frame in a selected one of said plurality of positions, the location of the fairlead in a first of said positions being generally vertically above but slightly rearward of the location of the fairlead in a second of said positions,
(d) a winch for pulling in a cable passing over said roller to a timber load for hauling the load to the vehicle and for subsequently towing the load during travel of the vehicle,
(e) and butt pan means forming part of said frame, said butt pan means being located between said wheels and having a surface extending transversely across the rear of the vehicle to act as a stop for said timber load, said butt pan surface being at least as far forward of the vehicle as said roller axis in both said positions of the fairlead.

5. In combination with a logging vehicle:
(a) a frame connected to a rear axle driving a pair of road wheels,
(b) an elevated fairlead mounted on said frame,
(c) a winch for pulling in a cable passing over said fairlead to a timber load for hauling the load to the vehicle and for subsequently towing the load during travel of the vehicle,
(d) said fairlead including like spaced-apart sides adapted to bear upon like spaced-apart sides of said frame, with said fairlead sides bearing upon said frame sides and being adjustable relative to said frame sides,
(e) and means engageable by the said side for securing said sides together and thus positioning said fairlead on the frame in a selected one of plurality of positions, the location of the fairlead in a first of said positions being generally vertically above the location of the fairlead in a second of said positions and at least as far to the rear of the vehicle as in said second position.

6. The combination of claim 5, wherein the location of the fairlead in said first position is shifted slightly rearward of the location of the fairlead in said second position, the degree of such rearward shift being less than that of the vertically upward shift.

7. The combination of claim 6, wherein said engageable means include means for securing said sides together in a third position in which the location of the fairlead is generally vertically above but shifted slightly rearward of its location in said first position, the degree of such last-mentioned rearward shift being less than that of the last-mentioned vertically upward shift.

8. The combination of claim 5, wherein the location of the fairlead in each position is rearward of the axis of said rear axle.

9. In combination with a logging vehicle:
(a) a frame connected to a rear axle driving a pair of road wheels,
(b) an elevated fairlead monuted on said frame, said fairlead including a pair of like spaced-apart, parallel side plates between them freely pivotally supporting a roller about a horizontal axis at a fixed upper location thereon, said side plates having lower portions bearing upon correspondingly spaced-apart side members of said frame, said side plates being adjustable relative to said side members between a plurality of positions,
(c) means engaging said side plates and side members for securing the same together and thus for positioning said fairlead on the frame in a selected one of said plurality of positions, the location of the fairlead in a first of said positions being generally vertically above the location of the fairlead in a second of said positions and at least as far to the rear of the vehicle as in said second position,
(d) and a winch for pulling in a cable passing over said roller to a timber load for hauling the load to the vehicle and for subsequently towing the load during travel of the vehicle.

References Cited

UNITED STATES PATENTS

| | | | |
|---|---|---|---|
| 1,901,566 | 3/1933 | Presbrey | 214—512 |
| 2,643,012 | 6/1953 | Wahl | 214—85.1 |
| 2,827,715 | 3/1953 | Wagner. | |
| 3,233,762 | 2/1966 | Cross | 214—85.5 |
| 3,265,428 | 8/1966 | Gilbert et al. | 214—85.1 |
| 1,856,082 | 5/1932 | Remde | 214—147 |

FOREIGN PATENTS 720,488   12/1954   Great Britain.

ALBERT J. MAKAY, Primary Examiner

U.S. Cl. X.R.

254—139.1